United States Patent [19]

Cohen

[11] Patent Number: 4,569,831
[45] Date of Patent: Feb. 11, 1986

[54] PROCESS AND APPARATUS FOR CALCINING GYPSUM

[75] Inventor: Sidney M. Cohen, Allentown, Pa.

[73] Assignee: Fuller Company, Bethlehem, Pa.

[21] Appl. No.: 718,592

[22] Filed: Apr. 1, 1985

[51] Int. Cl.$^4$ .................. C04B 11/00; C04B 11/02; C01F 11/46
[52] U.S. Cl. .................................. 423/171; 423/555; 106/110
[58] Field of Search ............... 423/555, 170, 171, 172; 106/109, 110, 111, 114, 115

[56] References Cited

U.S. PATENT DOCUMENTS

| | | | |
|---|---|---|---|
| 2,409,707 | 10/1946 | Roetheli | 106/100 |
| 2,956,366 | 12/1960 | Omaka et al. | 106/100 |
| 3,648,994 | 3/1972 | Remmers | 423/555 |
| 3,773,892 | 11/1973 | Reinmann et al. | 423/172 |
| 3,829,280 | 8/1974 | Jenne et al. | 423/555 |
| 3,956,456 | 5/1976 | Keller et al. | 423/555 |

FOREIGN PATENT DOCUMENTS

| | | | |
|---|---|---|---|
| 2705463 | 8/1978 | Fed. Rep. of Germany | 423/555 |
| 52-480 | 1/1977 | Japan | 423/555 |
| 2018233 | 10/1979 | United Kingdom | 106/109 |

Primary Examiner—Gary P. Straub
Attorney, Agent, or Firm—Frank H. Thomson

[57] ABSTRACT

An apparatus and process for calcining gypsum is disclosed which utilizes a flash furnace for rapidly calcining fine particulate gypsum while the material is suspended in a stream of hot gas. The method and apparatus utilize a two-stage suspension preheater for utilizing waste gases from the calcining furnace for preheating raw material to be calcined and a two-stage suspension cooler for cooling hot calcined gypsum which is discharged from the calcining furnace. Spent cooling gas is supplied to the preheater for use in preheating the fresh gypsum to be calcined. The invention also contemplates recirculating a portion of the gypsum discharged from the furnace back to the furnace for further calcination. Hot product may be discharged directly from the furnace.

7 Claims, 1 Drawing Figure

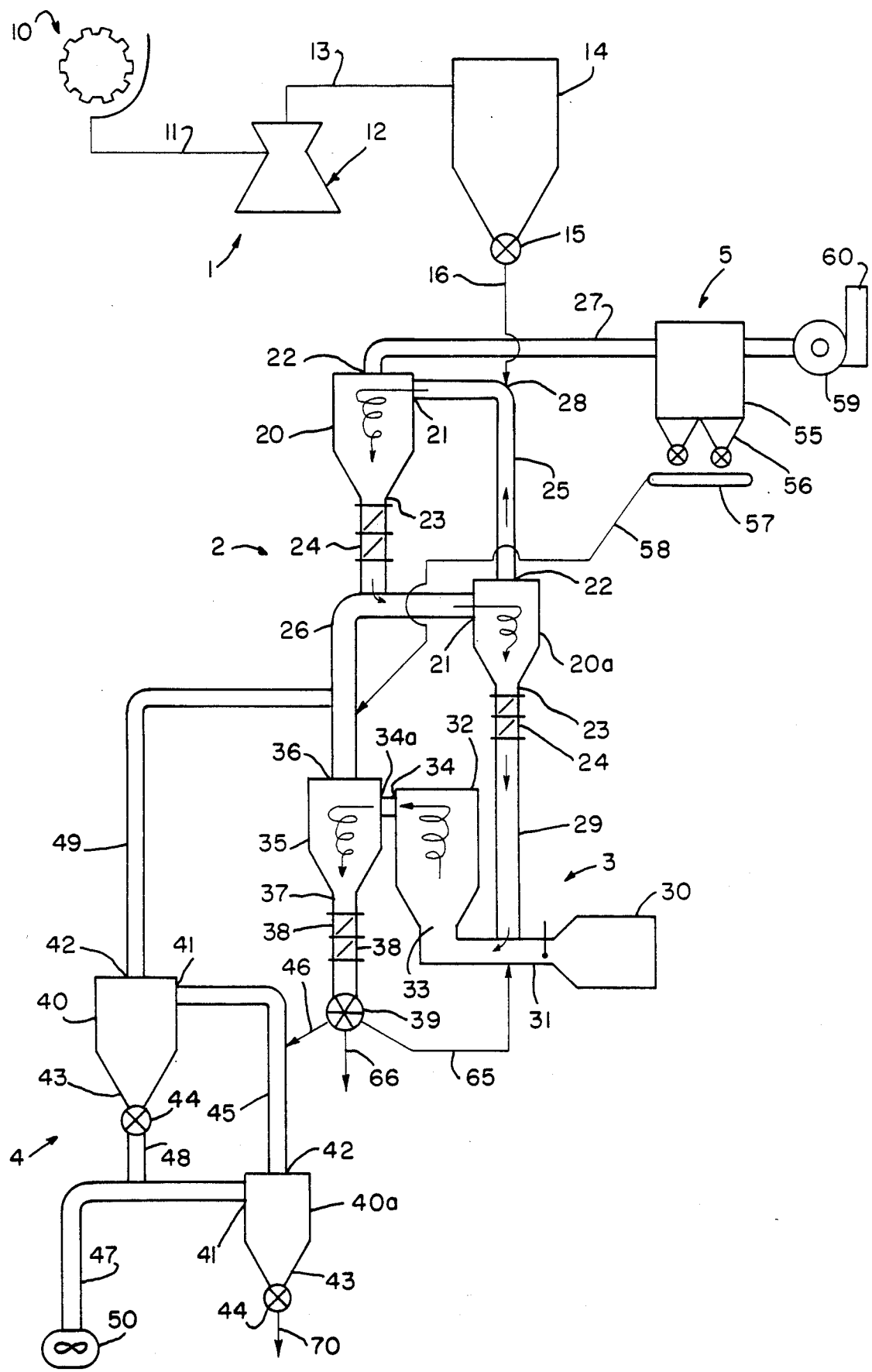

PROCESS AND APPARATUS FOR CALCINING GYPSUM

BACKGROUND OF THE INVENTION

The present invention relates to calcining gypsum while in suspension in a heated gas stream. More particularly, the invention relates to a process and apparatus for calcining gypsum while in suspension in a hot gas stream which permits a control over the degree of calcination to be achieved.

The raw material for gypsum is calcium, sulfate, dehydrate ($CaSO_4$ $2H_2O$) which can be converted by calcining to a number of phases which depend on the calcining conditions. The raw material is dehydrated at approximately 375° F. to form the hemihydrate ($2CaSO_4$ $H_2O$) which is basis of most gypsum plasters and called calcined gypsum or, when used for making ornaments or casts, it is called Plaster of Paris. When mixed with water it forms the hydrated sulfate that solidifies and sets firm due to interlocking crystallization.

If calcined further to anhydrous anhydrite ($CaSO_4$) the material may be used as a paper filler under the name of Pearl filler. An anhydrous calcium sulfate in powder or granular form will absorb 12% to 14% of its weight of water and is used as a drying agent for gases and chemicals. It can be regenerated for reuse by heating the material and drying off the water.

Prior to the present invention, most plaster manufacturing has been done in a batch calcining kettle which accomplishes the work in 2½ hours at temperatures on the order of 280° F. to 335° F. in a 15 ton batch. Feed size is around 1¼ inch as the largest size. The kettle product is ground to produce a final product. Plaster has also been manufactured in a rotary kiln utilizing a stone feed on the order of 1½ inch size. The product goes through a hammer mill followed by a grinding mill to produce 70% to 95% minus 100 mesh plaster product. Neither the rotary kiln system nor the batch calcining kettle of common practice has much heat recovery and is not an energy efficient process.

Calcining gypsum in a current of hot gas is disclosed in U.S. Pat. No. 3,489,994 issued Mar. 14, 1972. This patent discloses calcining the gypsum while the material is within suspension in a hot gas stream in a cyclone. There may be two stages of heating with hot gas serially supplied first to one cyclone then to a second cyclone. The material to be calcined is supplied first to the second cyclone and then alternately either to the first cyclone or to a cooling apparatus. Water is sprayed onto the calcined product for cooling the product and controlling moisture content. With this prior device, the moisture content in the product is controlled by the cooling cycle. Thermal economies are not achieved with this type of apparatus because the heat content in the product is not utilized in the calcining process. In addition, there is no arrangement for controlling the degree of calcination within the calcining vessel.

Another type of apparatus for calcining gypsum in suspension is disclosed in U.S. Pat. No. 3,956,456 issued May 11, 1976. In this device a complex calcining furnace is utilized and there is an absence of thermal economy in the system.

It would be desirable to provide a process and apparatus for calcining gypsum which utilizes the heat of the product in the calcining process and the spent calcining gases in a preheating stage in order to reduce fuel consumption of the total process.

Prior practice has relied upon calcining temperature to vary the degree of calcination. According to the present invention, material can be recirculated through the calcining furnace to control the amount of calcination. At varied temperatures and degree of calcination different products of gypsum can be produced, for example 320° F. product is used for modeling plaster and at 650° F. gypsum plaster is produced.

SUMMARY

It is a principal object of this invention to provide a process for calcining gypsum which provides for thermal economies and fuel savings when compared to prior processes.

It is a further object of this invention to provide an apparatus and process for calcining gypsum which utilizes spent gas from the calcining furnace for preheating the material to be calcined and a suspension cooler which creates gas for use in the calcining process. The process and apparatus also includes an arrangement for recirculating to the calcining furnace a portion of the gypsum which has already passed through the calcining furnace to thereby provide a control for the amount of the calcination accomplished.

In general, the foregoing and other objects will be carried out by providing a process for calcining gypsum comprising the steps of: providing a furnace means for calcining gypsum; supplying hot gas and gypsum to be calcined to the furnace means whereby the hot gas at least partially calcines the gypsum within the furnace means while the gypsum is suspended in the hot gas; discharging at least partially calcined gypsum from the furnace means; separately discharging hot gas from said furnace means; cooling at least a portion of the at least partially calcined gypsum discharged from the furnace means by suspending the calcined gypsum in cooling gas whereby the cooling gas is heated and the calcined gypsum is cooled; preheating fresh gypsum to be calcined by suspending the fresh gypsum in the hot gas discharged from the furnace means and the heated cooling gas; and selectively recirculating to the furnace means a portion of the at least partially calcined gypsum discharged from the furnace means for further calcining.

The apparatus of the present invention is carried out by providing an apparatus for calcining gypsum comprising a preheater for preheating fresh gypsum to be calcined including an inlet for hot preheating gas, an inlet for fresh gypsum to be calcined and an outlet for preheated gypsum; furnace means including an inlet for preheated gypsum flow connected to the outlet for preheated gypsum of the preheater, means for producing hot gas for at least partially calcining gypsum, an outlet for hot at least partially calcined gypsum and an outlet for hot gas flow connected to the inlet for hot preheating gas of the preheater; a cooler for cooling calcined gypsum including an inlet for hot, at least partially calcined gypsum flow connected to the outlet for at least partially calcined gypsum of the furnace means, an inlet for cooling gas whereby heat exchange contact between the hot calcined gypsum and the cooling gas occurs within the cooler, the hot calcined gypsum is cooled and the cooling gas is heated, an outlet for cooled calcined gypsum and an outlet for heated cooling gas flow connected to the inlet for hot preheating gas of the preheater.

BRIEF DESCRIPTION OF THE DRAWING

The invention will be described in connection with a single FIGURE of the drawing which is a diagrammatic view of the apparatus of the present invention for carrying out the process of the present invention.

DESCRIPTION OF THE PREFERRED EMBODIMENT

The apparatus of the present invention includes a raw material preparation stage generally indicated at 1, a preheater generally indicated at 2, a furnace means generally indicated at 3 and a cooler generally indicated at 4. The apparatus will also include a high efficiency dust collection system generally indicated at 5.

The raw material preparation system 1 may include a crusher diagrammatically indicated at 10 in which large pieces of material as mined are broken down into smaller pieces and supplied through a suitable conveying system diagrammatically illustrated at 11 to a grinding mill 12 which may be either a ball mill or a roller mill. All of this equipment is generally known per se in the art and need not be described in detail. Material is supplied through a conveying line 13 to a storage bin 14. The bin 14 may include a valve 15 for metering flow out of the bin 14.

The preheater 2 includes at least a pair of substantially identical gas-solids separators of the cyclone type indicated at 20 and 20a. Each cyclone includes a tangential inlet 21 for hot gas and entrained solids, a top outlet 22 for separated gas and a lower material outlet 23 for separated preheated fresh gypsum. Each outlet may include a double tipping valve or other air lock generally indicated at 24 for controlling flow of material out of the cyclone 20 while maintaining an air seal. A duct 25 connects the cyclone 20a with the inlet 21 of cyclone 20. A duct 26 is flow connected to the inlet 21 of cyclone 20a. A conduit 27 flow connects the outlet 22 of gas-solids separator 20 with the high efficiency dust collector means 5.

Fresh material to be calcined is supplied from the bin 14 through conduit 16 to the duct 25 so that fresh material may be entrained in a stream of hot preheating gas being supplied from gas-solids separator 20a through duct 25 to gas-solid separator 20.

The conduit 16 and its juncture with conduit 25 defines an inlet 28 for fresh gypsum to be calcined. The preheater 2 also includes an outlet for preheated gypsum and is defined by duct 29 flow connected to the downstream side of valve 24 on cyclone 20a. According to the present invention, the step of preheating fresh gypsum includes sequentially passing the fresh gypsum through at least a pair of serially connected gas-solids separators by alternately entraining the gypsum in a heated gas stream and separating the gypsum from the heated gas stream.

The furnace means 3 includes a combustion chamber 30 for producing hot gas. This combustion chamber 30 is of a type generally known in the art and may be supplied with fuel and air for combustion from a suitable source (not shown). The furnace means 3 also includes a stationary vessel or flash calciner indicated at 32 having a lower inlet 33 for hot gas flow connected by conduit 31 to the combustion chamber 30. The inlet 33 also serves as an inlet for gypsum to be calcined as will be described hereinafter.

The vessel 32 includes an upper outlet 34 for hot gas and entrained gypsum. The outlet 34 is close coupled to a gas-solids separator 35 of the cyclone type including a tangential inlet 34a flow connected to outlet 34 an outlet 36 for hot spent calcining gas and an outlet 37 for separated at least partially calcined gypsum. A pair of double tipping valves 38 or other flow control means may be provide at the outlet 37. The gas inlet conduit 26 of the preheater 2 is flow connected to the outlet 36 to define a means for supplying hot preheating gas to the preheater 2.

The furnace means 3 also includes a splitter 39 for dividing the calcined product into a plurality of streams.

The cooler 4 includes at least a pair of serially connected gas-solids separators of the cyclone type indicated at 40 and 40a. Each separator includes a tangential inlet 41 for gas and entrained material, and outlet 42 for separated gas and an outlet 43 for separated solids. The outlets 43 may have a rotary valve 44 for controlling the flow of material therethrough while maintaining a seal in the cyclone. As an alternate, any other valves such as the double tipping valves of the preheating apparatus may be utilized. A conduit 45 flow connects the outlet 42 of separator 40a with the gas entrained solids inlet 41 of separator 40. Hot calcined gypsum to be cooled may be supplied from distributor or splitter 39 through a conduit 46 to conduit 45 where the material is entrained in the gas stream flowing conduit 45. The juncture of the conduit 46 with conduit 45 defines an inlet for hot at least partially calcined gypsum flow connected to the outlet 37 for at least partially calcined gypsum of the furnace means 3.

The cooler 4 also includes a conduit 47 connected at one end to a source of cooling gas such as a blower 50 for supplying ambient air and at its other end to the inlet 41 of the gas solid separator 40a. A conduit 48 connects the outlet 43 of cyclone 40 with the conduit 47 for supplying material to be cooled from the first cooling stage 40 for entrainment in the cooling gas in duct 47 and supply to the second cooling stage 40a. A conduit 49 is flow connected at one end to the outlet 42 of cyclone 40 and at its other end to the conduit 26 for supplying heated cooling gas from the cooler 4 to the preheater 2. Thus, according to the present invention, the step of cooling the at least partially calcined gypsum includes sequentially passing the at least partially calcined gypsum through at least a pair of serially connected gas-solids separators by alternately entraining the gypsum in a cooling gas stream and separating the gypsum from the cooling gas stream.

The high efficiency dust collector system 5 includes a high efficiency dust collector or baghouse 55 with an outlet through fan 59 connected to stack 60. An outlet 56 which supplies collected dust to a conveyor belt 57 and conduit 58 for supply to conduit 26 and thus is returned to the system.

In the calcining operation, fresh material to be calcined is supplied from hopper 14 through conduit 16 to inlet 28 of the preheater 2. In the duct 25 the raw material is entrained in a flow of hot gas into the cyclone 20. Gas is discharged through conduit 27 to the high efficiency dust collector. While the material is entrained in the hot gas, it is preheated by the hot gas and then separated from the hot gas in cyclone 20. The partially preheated material is discharged through outlet 23 to duct 26 where it is entrained in hot gas and supplied to second stage preheater 20a. While in the duct 26 and in cyclone 20a the fresh gypsum to be calcined is further preheated. In the cyclone 20a hot gas is discharged through outlet 22 to duct 25 and preheated material is discharged through 23 to duct 29 and out of the preheater stage 2. Preheated material supplied to the furnace means 3 through conduit 29 may have a temperature of approximately 250° F.–450° F.

The duct 29 is flow connected to the conduit 31 downstream of the combustion chamber 30 and upstream of the inlet 33 of calcining vessel 32. The gypsum is exposed to the hot gases from the combustion chamber 30 and entrained and conveyed in these hot gases to the stationary vessel 32. In the vessel 32 the gypsum is at least partially calcined. The vessel 32 is preferably maintained at a temperature in the range of 300° F. to 650° F.

The hot gas from the vessel 32 is discharged along with entrained at least partially calcined gypsum through conduit 34 to close coupled cyclone 35 wherein the hot gas is separated from the particulate material and supplied to the preheater 2 through conduit 26. The at least partially calcined material is discharged through outlet 37 to distributor 39. From distributor 39 material may flow either through conduit 46 to the cooler 4 or be recirculated through conduit 65 to the duct 31 for recirculation through the furnace means 3. Also, the product may be discharged as hot product through conduit 66.

The cooler include supplying cooling gas (ambient air) from a source such as blower 50 through conduit 47 to cyclone 40a. The cooling gas then flows through duct 45 where it entrains material being supplied from conduit 46 and the furnace means 3 and conveys this material to cyclone 40. While in the conduit 45 and cyclone 40 the material is cooled and the cooling gas is heated by the hot material. The thus heated cooling gas is supplied through conduit 49 to the conduit 26 and preheater 2 to serve as a source of hot gas for preheating the fresh gypsum to be calcined. Material discharged from the first stage cooling cyclone 40 is supplied by duct 48 for entrainment in the cooling gas supplied through conduit 47. Cooled product is discharged through outlet 70. Cooled product will have a temperature in the range of 85° F.–150° F. Hot gas supplied from the cooler to the preheater through conduit 49 may have a temperature of approximately 200° F.–450° F.

According to the process of the present invention, there is preferably a recirculating load of up to 500%. This means that the amount of calcined material which is recirculated through duct 65 to conduit 31 for passage through the furnace means 3 a subsequent time may be as much as five times the amount of fresh material being supplied through conduit 16 to the inlet of preheater 2. This recirculation of material assures a higher degree of calcination of the gypsum. The precentage recirculation will depend on the degree of calcination desired. By having a higher recirculating load, the material passes through the furnace 3 a greater number of times effectively increasing the residence time of material in the furnace.

With the present invention, the residence time of the gypsum in the furance 2 is on the order ot 2.5 seconds. With such a residence time, gypsum raw material having a 21.5% loss on ignition (LOI) at 1652° F. may be reduced to a 12.28% on ignition LOI at 1652° F. when being subjected to temperatures which will achieve a produce discharge at outlet 37 of approximately 250° F. to approximately 400° F. If the circulating load is increased so that material passes through the furnace a second time so that the total residence time of the material within the furnace means 3 is increased to 5 seconds, the product loss on ignition may be on the order of 5.6%. Thus, it can be seen that the recirculation system of the present invention permits a higher degree of product calcination. As a result, by controlling recirculation there is a control over the product being produced.

From the foregoing it should be apparent that the objects of this invention have been carried out. An apparatus and process have been provided which utilizes the thermal economy achieved by the use of a suspension preheater followed by a suspension calcining system followed by a suspension cooler with the preheated air from the cooling apparatus being utilized for preheating the raw material and the spent hot calcining gases also being used for preheated the raw material. This utilization of hot gases can result in a substantial saving in fuel consumption and thus operating costs. Also with the present invention, the degree of calcination of the product can be controlled by the recirculation system employed. With the present invention residence time in the furnace means is short so that the fine gypsum is exposed to heat for a short period of time. Residence time is increased by increasing recirculation. This can be done in stages by, for example, increasing recirculating load incrementability such as from 100% to 200% until the desired degree of calcination is achieved. If, during operation the product becomes over burned, residence time can easily be decreased. In addition, the process and apparatus of the present invention can be used to produce several different gypsum products such as the hemihydrate ($CaSO_4.2H_2O$) or anhydrous anhydrite ($CaSO_4$).

The foregoing is intended to be a description of a preferred embodiment. It is intended that the invention be limited solely by that which is within the scope of the appended claims.

I claim:

1. A process for calcining gypsum comprising the steps of:

providing a furnace means for calcining gypsum;

supplying hot gas and gypsum to be calcined to the furnace means whereby the hot gas at least partially calcines the gypsum within the furnace means while the gypsum is suspended in the hot gas;

discharging at least partially calcined gypsum from the furnace means;

separately discharging hot gas from said furnace means;

cooling at least a portion of the at least partially calcined gypsum discharged from the furnace by suspending the calcined gypsum in cooling gas whereby the cooling gas is heated and the calcined gypsum is cooled;

preheating fresh gypsum to be calcined by suspending the fresh gypsum in hot gas discharged from the furnace means and the heated cooling gas; and selectively recirculating to the furnace means a portion of the at least partially calcined gypsum discharged from the furnace means for further calcining.

2. A process for calcining gypsum according to claim 1 wherein the step of preheating fresh gypsum to be calcined includes sequentially passing the fresh gypsum through at least a pair of serially connected gas-solids separators by alternately entraining the gypsum in a heated gas stream and separating the gypsum from the heated gas stream.

3. A process for calcining gypsum according to claim 2 wherein the step of cooling at least partially calcined gypsum includes sequentially passing the at least partially calcined gypsum through at least a pair of serially connected gas-solids separators by alternately entraining the gypsum in a cooling gas stream and separating the gypsum from the cooling gas stream.

4. A process for calcining gypsum according to claim 1 wherein the furnace means includes a stationary vessel having a lower inlet for hot gas and entrained gypsum to be calcined and an upper outlet for hot gas and entrained at least partially calcined gypsum from the hot gas and a gas-solids separator close coupled to the outlet of the stationary furnace for separating the at least partially calcined gypsum from the hot gas, the step of selectively recirculating to the furnace means a portion of the at least partially calcined gypsum includes supplying to the stationary vessel a portion of the at least partially calcined gypsum which is separated from the hot gas in the gas-solids separator close coupled to the stationary vessel.

5. A process for calcining gypsum according to claim 4 wherein the fresh gypsum to be calcined has a particle size of smaller than approximately 70 mesh and the at least partially calcined gypsum is discharged from the furnace means at a temperature between approximately 250° F. and approximately 400° F.

6. A process for calcining gypsum according to claim 5 wherein there is a recirculating load of up to 500% so that the quantity of at least partially calcined gypsum recirculated to the furnace means is up to five times the quantity of fresh gypsum to be calcined supplied to the furnace means.

7. A process for calcining gypsum according to claim 1 wherein the gypsum to be calcined is retained in said furnace means for approximately two and one half seconds.

* * * * *